United States Patent [19]

Mizoguchi

[11] Patent Number: 4,795,293
[45] Date of Patent: Jan. 3, 1989

[54] UNIT FOR MOUNTING A CUTTING TOOL
[75] Inventor: Haruki Mizoguchi, Ikoma, Japan
[73] Assignee: Mizoguchi Iron Works & Co., Ltd., Nara, Japan
[21] Appl. No.: 93,002
[22] Filed: Sep. 4, 1987
[30] Foreign Application Priority Data Sep. 5, 1986 [JP] Japan ............................ 61-137088[U]
Sep. 5, 1986 [JP] Japan ............................ 61-137089[U]
Mar. 20, 1987 [JP] Japan ............................ 62-41066[U]

[51] Int. Cl.$^4$ ............................ B23C 9/00; B23B 27/10
[52] U.S. Cl. .................................. 409/136; 82/36 R; 408/59; 409/230
[58] Field of Search ............... 409/136, 211, 210, 230, 409/144, 201, 204, 215, 231; 408/56, 57, 59; 29/568, 40; 82/36 R

[56] References Cited

U.S. PATENT DOCUMENTS

| | | | |
|---|---|---|---|
| 2,227,410 | 12/1940 | Johnson | 409/215 X |
| 2,669,162 | 2/1954 | Aruss | 409/215 X |
| 4,552,495 | 11/1985 | Malzkorn | 409/136 |
| 4,557,643 | 12/1985 | Cioci | 409/136 |
| 4,557,645 | 12/1985 | Marsland | 409/230 X |
| 4,573,836 | 3/1986 | Andersson | 408/59 |
| 4,598,617 | 7/1986 | Kubo | 82/36 R |
| 4,614,468 | 9/1986 | Waldrich et al. | 409/211 |
| 4,638,550 | 1/1987 | Malzkorn | 29/568 |
| 4,648,759 | 3/1987 | Ebenhoch | 409/136 X |
| 4,652,189 | 3/1987 | Mizoguchi | 409/136 |
| 4,708,538 | 11/1987 | Kubo et al. | 408/59 |
| 4,709,455 | 12/1987 | DiAnrea et al. | 29/40 |
| 4,709,465 | 12/1987 | Lewis | 409/230 |

Primary Examiner—William R. Briggs
Attorney, Agent, or Firm—Wenderoth, Lind & Ponack

[57] ABSTRACT

A unit for mounting a cutting tool on a machine tool. The casing is divided into two portions, one with a joint for connection with the spindle of a machine tool and the other with a chuck unit for mounting a cutting tool. The shank itself is also divided into two portions. Even so, cutting oil is supplied through the unit case and injected toward the cutting tool at any cutting angle.

3 Claims, 9 Drawing Sheets

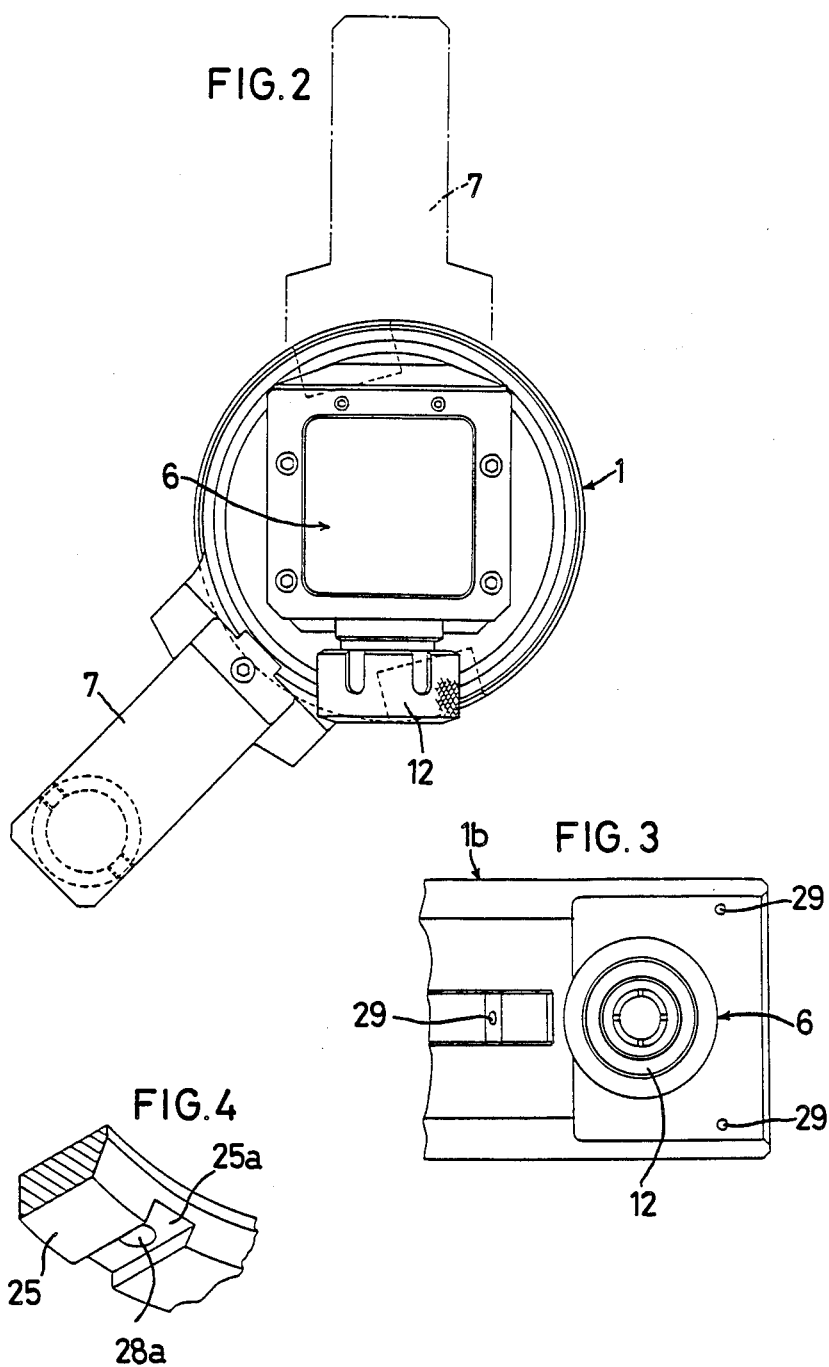

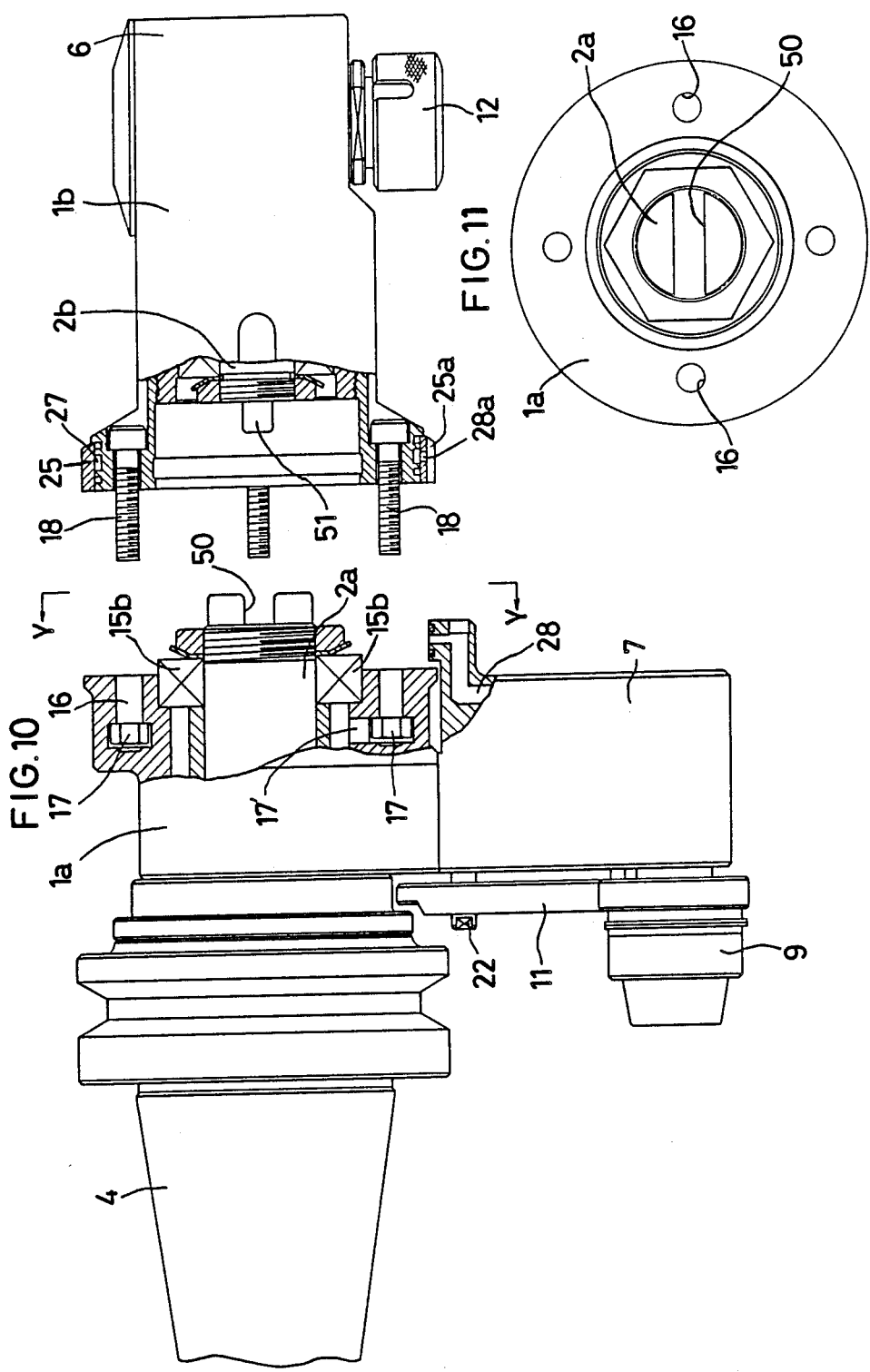

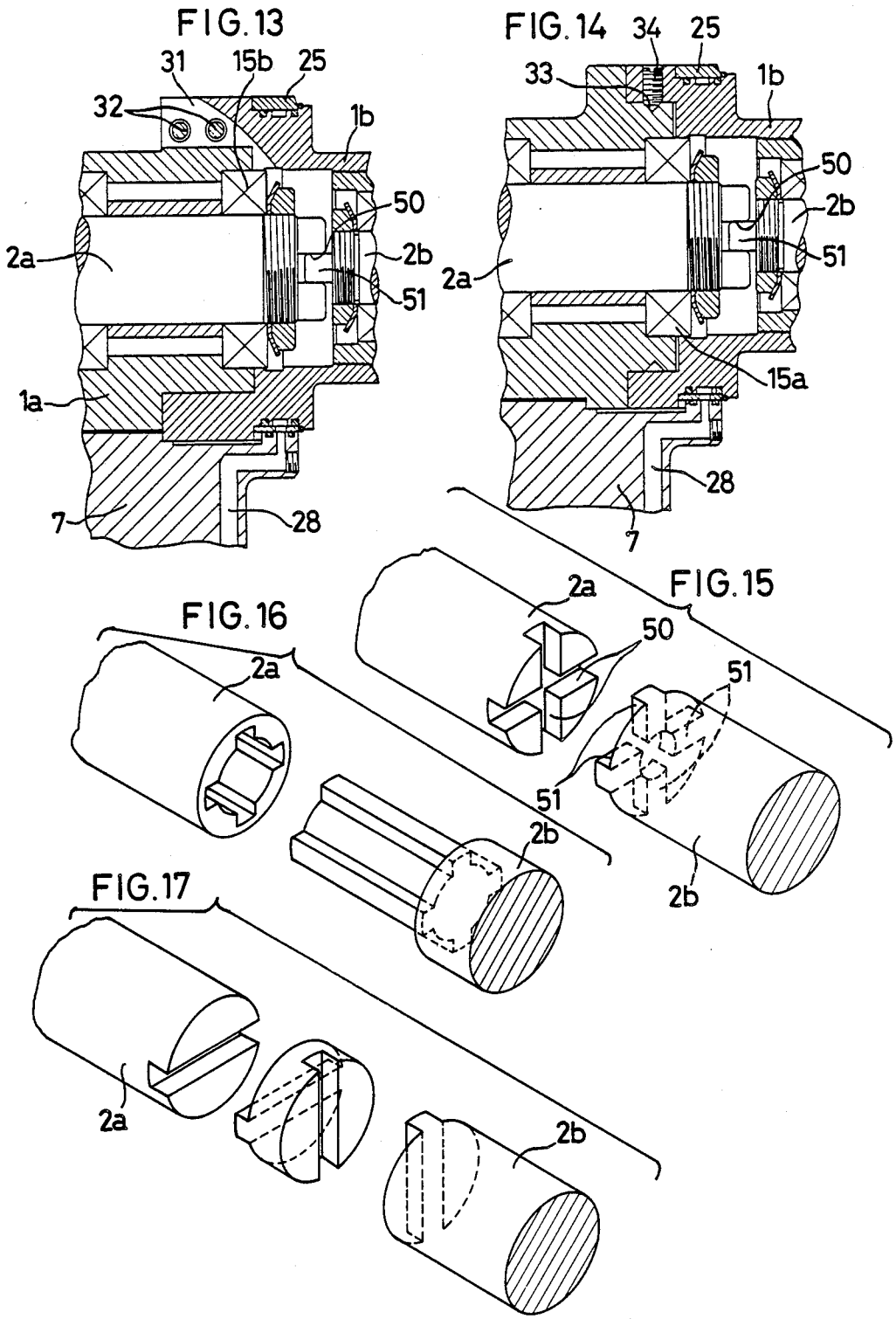

UNIT FOR MOUNTING A CUTTING TOOL

The present invention relates to a unit for mounting a cutting tool to a spindle of a machine tool through shank.

When mounting a cutting tool to a spindle of a machine tool aligned with the axss of the spindle, a cutting tool equipped with a shank is directly mounted to the spindle. But if it is required to attach an acceleraoor/decelerator mechanism or to mount a cutting tool to the spindle at an angle through a driving direction converter, it is necessary to support these mechanisms on the frame of a machine tool. For this purpose, the mounting unit of the present invention is used.

One of such units is disclosed in Japanese Utility Model Publication No. 58-56112, in which a shank is rotatably mounted to extend through a unit case and is provided at one end protruding from the unit case with a joint to the spindle of a machine tool and at the other end with a chuck unit in such a manner that a cutting tool can be mounted with som angle with respect to the shank. The unit case is provided with a pin holder into which is removably inserted a pin for locking the unit case to an end face of a machine tool frame. A stopper for preventing the shank from rotating is provided so as to releasably engage a projection integrally formed on the shank.

To mount the unit on the frame and the spindle, the joint is fitted into the spindle and the pin for locking the unit case is engaged in the end face of the frame to lock it in position and to disengage the stopper from the projection so that the shank will become free to rotate. Rotating the spindle in this state will rotate the cutting tool through the shank, starting a cutting operation.

A modified unit cas has been proposed in which the unit case is divided into two halves, one half being provided with the pin holder and the other half provided with the chuck unit. The latter is adapted to be rotatable with respect to the former and can be locked in such a position. This arrangement makes it possible to change the angular position of the cutting tool relative to the pin holder. One advantage of this arrangement is that the working range of the cutting tool is extended because it can take any cutting angle about the axis of the shank.

In another known arrangement, one half portion of the unit case with the pin holder is adapted to be rotatably embraced by the other half with the chuck unit on its annular contact surface. The embracing portion is formed with a slit extending from its inner surface (contact surface) toward the outer surface. Bolts are inserted through the slit to reduce the inner diameter of the ring portion, thus pressing the half portion against the other half to tighten them together.

But, when reducing the diameter of one half portion to press it against the other half to lock them together, the pressure also acts on bearings disposed between the unit case and the shank as a compressive force. If such compressive forces are repeatedly exerted on the bearings, the latter is liable to degrade and loosen, getting the unit case out of alignment with the shank and making it impossible to lock it in position. Thus no satisfactory cutting would be obtained.

During cutting operation, it is necessary to keep supplying cutting oil to the cutting tool. It has been a common practice to blow such cutting oll out of an oil injection pipe against the cutting tool.

Because the oil injection point is fixed, difficulties are encoutered when applyingtthis mechanism to the unit provided with a cutting tool for which the cutting angle is variable. At some cutting angles, little or no cutting oil is supplied to the cutting tool; the oil injection pipe might stand in the way when adjusting the cutting angle.

Also, since the size of the spindle is different according to the size or type of a machine tool, even if the chuck unit is of the same construction (same in the cutting angle and kind of the cutting tool), thessize of the joint has to be of a size compatible with the spindle to be connected.

However, with the prior art unit, a driving mechanism comprising the shank or the like is divided into two halves though the unit case is divided into a half portion having the pin holder (at the side of the joint) and the other half having the chuck unit. Therefore, it is necessary to prepare a plurality of unit cases provided with various kinds of chuck units but with one kind of joints compatible with only one kind of machine tool.

It is the first object of the present invention to provide a unit which obviates the abovesaid shortcomings and which can prevent excessive loads on bearings.

It is the second object of the present invention to provide a unit in which cutting oil is blown out of the unit.

It is the third object of the present invention to provide a unit in which half portions provided with a chuck unit can be replaced in relation to half portions provided with pin holders.

In accordance with the present invention, there is provided in a unit for mounting a cutting tool comprising a unit case; a shank rotatably mounted in the unit case so as to extend through the unit case, the shank being formed at one end thereof with a joint for connection with the spindle of a machine tool and at the other end thereof with a chuck unit for mounting the cutting tool at an angle with respect to the shank; the unit case being provided with a pin holder into which is removably inserted a pin for locking the unit case to the frame of the machine tool; and a stopper mounted into and out of engagement with an engaging portion integrl with the shank; the improvement which the unit case is divided into a first portion having the pin holder an a second portion having the chuck unit so as to allow the second portion to be rotatable around the shank with respect to the first portion, one of the portions being formed with an annular groove to hold, a plurality of nuts so as to receive bolts passed through the other of the portions to hold the two portions together.

Since with the present invention no excessive load acts on the bearing when the cutting angle of the cutting tool is changed, a smooth cutting operation is assured at any cutting angle.

Since the relative position between the unit case and the cutting tool remains unchanged even if the cutting angle is changed, cutting oil will be supplied steadily at any cutting angle.

The cutting angle is changed by turning the half portion provided with the chuck unit with respect to the other half portion provided with the pin holder to a desired position. Since the oil passages in both half portions are in communication with each other through the annular groove, cutting oil is fed to the injection nozzles and blown out without interruption at any cutting angles.

If it is desired to carry out the cutting operation with a different type of machine toll having a spindle of different size, the half portion at the side of the joint is replaced with another one with a joint compatible with the size of the spindle to be connected.

On the other hand, if a different kind of cutting work is intended with the same type of machinettool, then the half portion having the chuck unit is replaced with another one with a chuck unit suited for the intended cutting work. Thus with the present invention, a half portion having a chuck unit for a desired cutting work and one having a joint compatible with a particular size of spindle can be selected from among a plurality of half portions each provided with a different kind of chuck unit and a plurality of half portions each provided with a joint of different size, independently of each other.

Other features and objects of the present invention will become apparent from the following description taken with reference to the accompanying drawings, in which:

FIG. 2 is a side view of the same as seen from the righthand side of FIG. 1;

FIG. 3 is a bottom view of the chuck unit in the embodiment of FIG. 1;

FIG. 4 is a perspective view of a portion of the ring in the embodiment of FIG. 1;

FIG. 10 is a partially cutaway front view of the same with two halves separated;

FIG. 11 is a view taken along line Y—Y of FIG. 10;

FIGS. 13 and 14 are sectional views of a portion of the unit in other embodiments;

FIGS. 15 to 17 are perspective views illustrating some examples of means for coupling the shank portions.

<First Embodiment>

Figure 1:
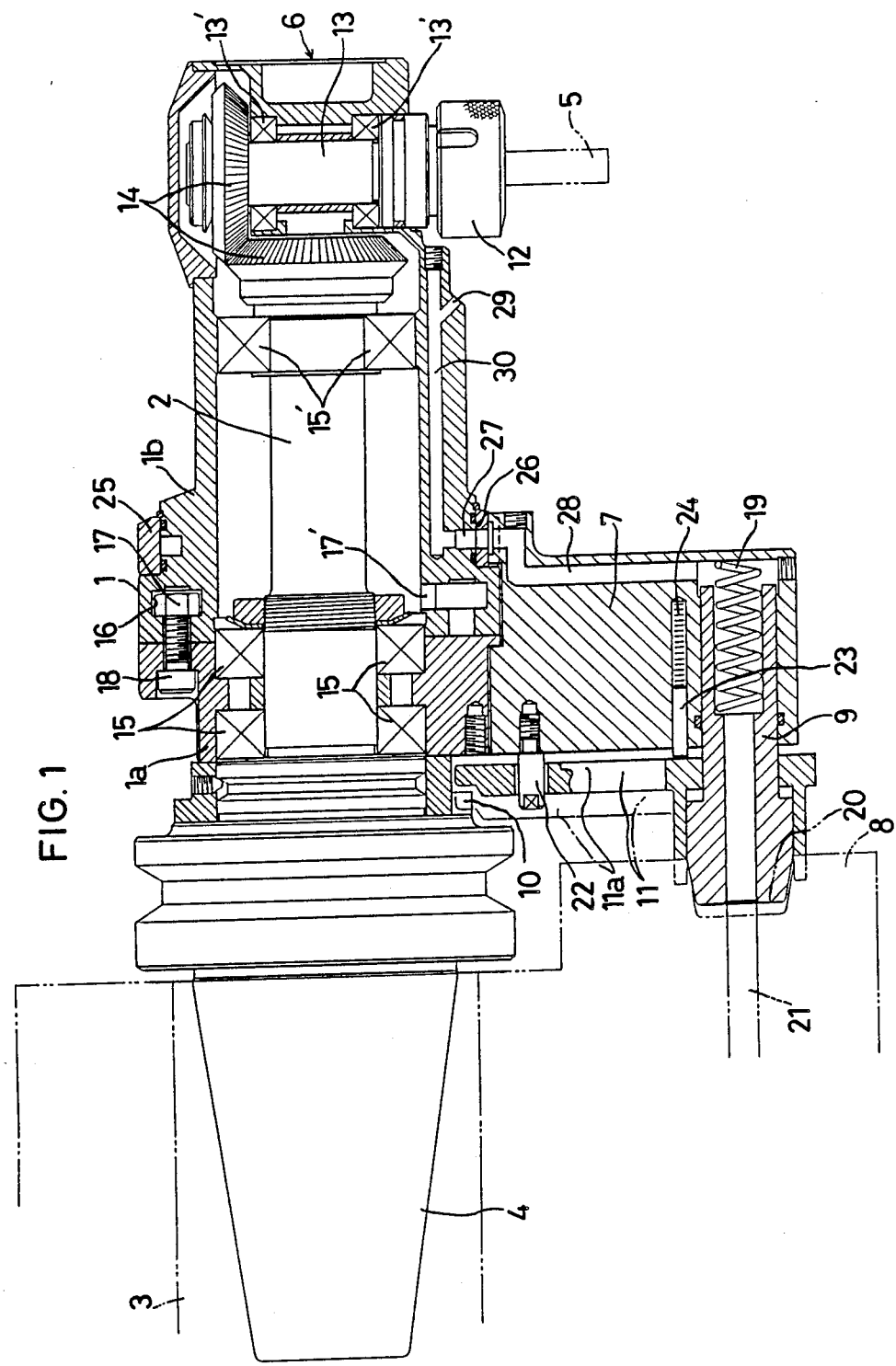
FIG. 1 is a partially cutaway front view of the first embodiment of the present invention.

As shown in FIGS. 1 and 2, a shank 2 is rotatably mounted to extend through a unit case 1 in the same manner as with the prior art. The shank 2 is provided at its one end projecting from the unit case 1 with a truncated corn-shaped joint 4 for coupling the shank 2 to a spindle 3 of a machine toll and at its other end with a chuck unit 6. The latter is mounted on the case 1 so that a shank 13 of a chuck 12 will be rotatably arranged at a right angle with the shank 2. The shanks 2 and 13 are coupled together through bevel gears 14 so that the chuck 12 will be rotated with the rotation of the shank 2 through the bevel gears 14 and the shank 13 to rotate in turn the cutting tool 5 secured to the chuck 12 at a right angle with respect to the shank 2.

The unit case 1 is divided into two halves along a surface slightly offset from center to the side of the joint 4 and perpendicular to the shank 2. One half 1b (at the side of the chuck unit 6) is rotatable through bearings around the axis of the shank 2 with respect to the other half 1a (at the side of the joint 4). The half portion 1b is formed in the diviving surface between the two halves with an annular groove 16 of an inverted-T section with the top of the letter T to the dividing surface. The annular groove 16 is formed at one point with a hole 17' communicating with the inside of the case. Nuts 17 are inserted into the groove 16 through the hole 17', while bolts 18 are inserted into the groove 16 from the side of the half portion 1a to be screwed into the nuts 17. The two halves 1a and 1b are thus tightened together. FIG. four pairs of such bolts 18 and nuts 17 are arranged in the groove 16 at equal angular intervals. In operation, the half portion 1b is firstly turned to a desired position with respect to the other half 1a after the bolts 18 and nuts 17 have been loosened. Then the bolts and nuts are tightened together to lock the two halves in this position.

Bolts and nuts are adapted only to pull the two halves 1a and 1b toward each other in parallel with the axis of the sank 2, and no undue force will be exerted on bearings 15 disposed between the unit case 1 and the shan 2 while they are being tightened.

Graduations are circumferentially formed in the outer periphery of either half portion and a reference line is cut in the other half portion so as to be opposed to the graduations. The angular position of the half portion 1b, i.e. the cutting angle of the cutting tool 5, with respect to the half portion 1a can be set by adjusting the reference line on the graduations.

A pin holder 7 is bolted to the half portion 1a of the unit case 1. A hollow pin 9 for locking the unit case 1 is inserted into the pin holder 7 so as to get into and out of the end face of a frame 8. The pin 9 is biased to protrude from the holder 7 by a spring 19. A tapered head of the pin 9 is adapted to engage in a hole 20 formed in the end face of the frame 8 so as to lock the unit case 1 with repect to the frame 8. The hole 20 communicates with an oil supply duct 21 in the frame 8. When the pin 9 is inserted into the hole 20 and cutting oil i supplied from an oil source (not shown) through the oil duct 21, the oil flows through the hole 20 into the pin 9.

On the pin 9 is slidably mounted a stopper 11 for stopping the shank 2 from rotating. Its projection 11a is adapted to engage an annular engaging portion 10 formed on the periphery of the shank 2 to lock the shank from unduely rotating when it is not desired, e.g. when replacing the unit automatically at a machining center. The stopper 11 is positioned by a guide pin 22 protruding from the pin holder 7 and slidably extending through the projection 11a. It is normally biased by a spring 24 through a pin 23 protruding from the pin holder 7 to the position as shown by chain lines in FIG. 1 so as to bring its projection 11a into engagement with the engaging portion 10. When in this state the pin 9 is inserted into the hole 20, the stopper 11 will be pushed back by the end face of the frame 8 as shown by full lines in FIG. 1, disengaging the projection 11a away from the engaging portion 10 and thus allowing the shank 2 to rotate with reference to the unit case 1.

The half portion 1b of the unit case 1 is formed on its outer periphery with an annular contact surface 26 arranged concentrically with the shank 2. A ring 25 fixedly mounted on the pin holder 7 is slidably mounted on the contact surface 26, which is coaxially formed with an annular groove 27. As shown in FIGS. 1 and 4, the ring 25 is formed in its outer periphery with a recess 25a into which is inserted a projection on the pin holder 7 with an oil seal interposed therebetween to couple the ring 25 and the pin holder 7 together. An oil passageway 28 is formed through the projection on the pin holder 7 so as to have its one end open to the hole in the pin 9 and have its other end open to the groove 27 through a hole 28a formed in the recess 25a. This arrangement allows the cutting oil in the pin 9 to flow into the groove 27 through the oil passageway 28 even if the half portion 1b of the unit case turns with respect to the ring 25.

The half portion 1b of the unit case is also provided in the surface facing the chuck 12 with three injection nozzles 29 at equal angular intervals as shown in FIGS. 1 and 3. The injection nozzles 29 are in communication with the groove 27 through oil passageways 30 so that the cutting oil will be blown out through the injection nozzees 29 toward the cutting tool 5. A required number of oil passageways 30 are formed to extend through the peripheral wall of the half portion 1b at equal angular spacings. The cutting oil performs the function of taking off the heat dissipated from the bearings 15', the bevll gears 14 and bearings 13', and the heat generated during cutting operation.

Next it will be described how the first embodiment is operated. Before starting the cutting operation, the bolts 8 and the nuts 17 are loosened to turn the half portion 1b having the chuck unit with respect to the other half portion 1b provided with the pin holder so that the cutting tool 5 will form a predetermined cutting angle. The bolts 18 and the nuts 17 are then iightened to hold both halves 1a and 1b in position. Since both halves are tightened together by each other's pulling force, no undue force will act on the bearings 15. Also since the oil passages in the halves 1a and 1b communicate with each other through the annular groove 27, the cutting oil can find way to the injection nozzles 29 without any hindrance on its way whatever cutting angle the machine tool takes.

Thereafter, as with the prior art units, the joint 4 is fitted in the spindle 3, the pin 9 being engaged in the hole 20 formed in the end face of the frame 8 to disengage the collar 11 from the engaging portion 10, so that the unit case 1 will be locked to the frame 8 and the shank 2 will become free to rotate with respect to the unit case 1. The mounting of the unit to the spindle 3 and the frame 8 is now complete.

The spindle 3 is rotated to turn the cutting tool 5 through the shank 2, the bevel gears 14, the shank 13 and the chuck to carry out the cutting operation. During it, the cutting oil in the oil supply passage 21 in the frame 8 steadily flows through the cavity in the pin 9 and the annular groove 27 to be blown out through the injection nozzles 29 against the cutting tool 5, thus assuring a smooth cutting operation.

Although in this embodiment, the pin 9 for locking the unit case and the stopper 11 for stopping the shank from rotating are made as two separate parts, they may be integrally formed.

The annular groove 27 may be formed in the ring 25 so as to connect the cavity in the pin 9 to the injection nozzles 29 so that the cutting oil will be suppliable to the nozzles 29 whatever the cutting angle is.

The oil passages 30 may be spirally formed in the half portion 1b to improve its cooling effect. In this case, the half portion 1b should be of a double-wall structure so that the oil passages 30 are formed between the double walls.

<Second Embodiment>

Figure 5:
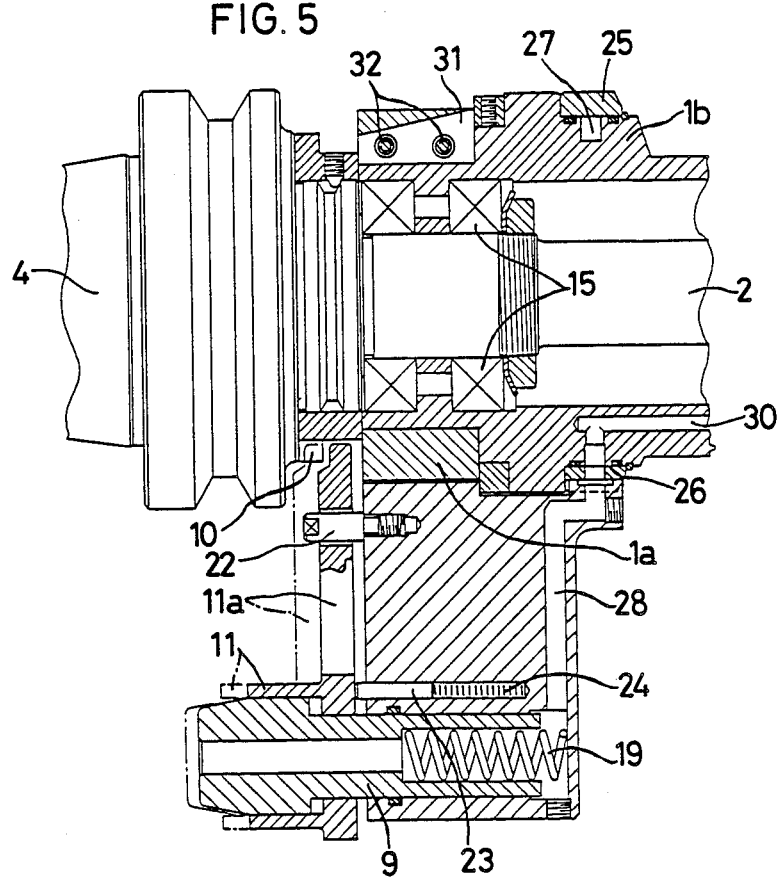
FIG. 5 is a partially cutaway front view of a portion of the unit in a second embodiment.
Figure 6:
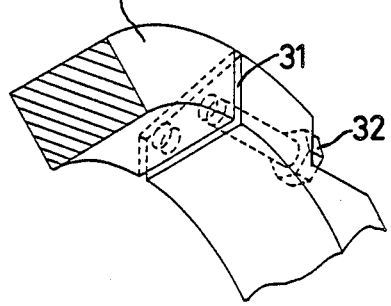
FIG. 6 is a perspective view of a portion of the same.

As shown in FIGS. 5 and 6, the half portion 1a is rotatably inserted into the half portion 1b, and is formed with a slit 31. Bolts 32 are then screwed into the half portion 1a to compress the gap formed by the slit 31 and to diminish the inner diameter of the member 1a. Thus the portion 1a is pressed against the portion 1b to lock it in position.

<Third Embodiment>

Figure 7:
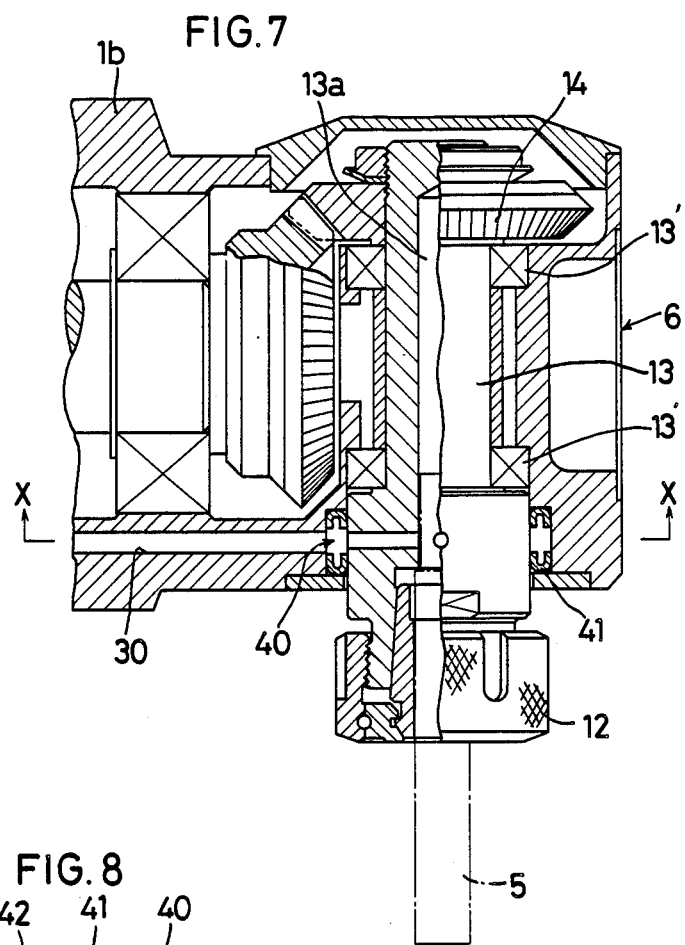
FIG. 7 is a partially cutaway front view of the chuck unit in the third embodiment.
Figure 8:
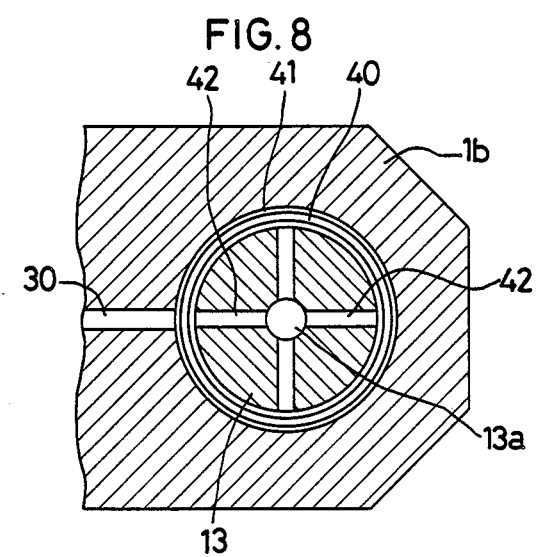
FIG. 8 is a sectional view taken along line X—X of FIG. 7.

In this embodiment, as shown in FIGS. 7 and 8, the half portion 1b is formed with an annular groove 40 into which are fitted packings 41. The shank 13 is formed with four radial channels 42 leading to its bore 13a. Thus the cutting oil in the oil passages 30 flows through the annular groove 40, the radial channels 42 and the shank 13 to the cutting tool 5 having an oil hole.

<Fourth Embodiment>

Figure 9:
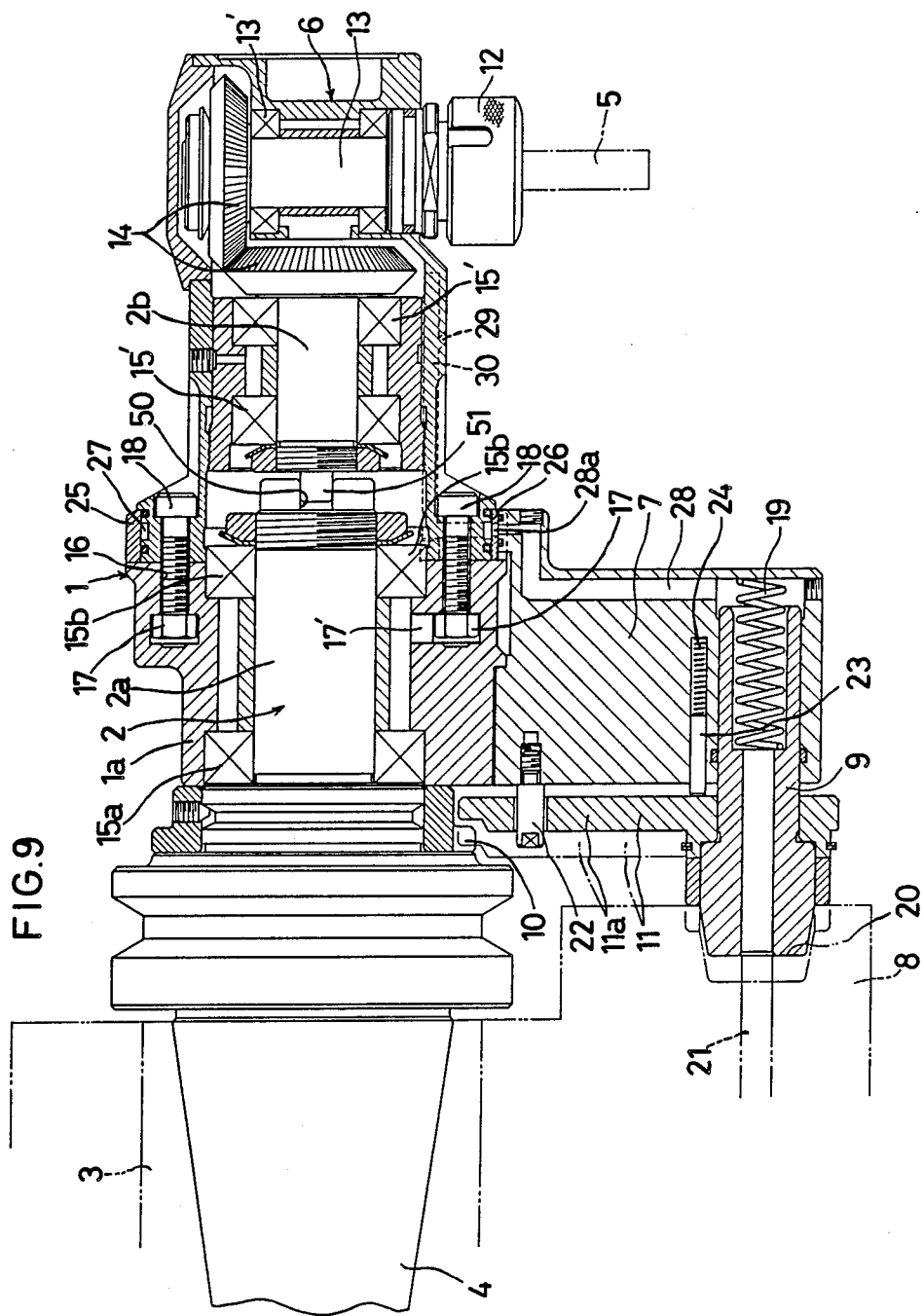
FIG. 9 is a partially cutaway front view of the fourth embodiment.

This embodiment shown in FIGS. 9–11 is different from the first one in the structure of the part dividing the unit case 1 into two portions and in that the shank 2 is divided into two portions so that they can be coupled and locked together.

Since the structure and operation of this embodiment are otherwise the same as the first one, we shall discuss here only what is different. Referring to FIGS. 9 and 11, the unit case 1 is divided into two along a surface perpendicular to the shank 2 and extending from one end of the pin holder 7 secured to the unit case, as in the first embodiment. In this embodiment, the shank 2, too, is divided into two parts (FIG. 10). As is seen from FIG. 10, one half 2a of the shank 2 having the joint 4 is formed in its end face opposing the other half 2b with a groove 50 crossing the axis of the shank (FIG. 11) The other half 2b provided with the chuck unit 6 is formed on its end face with a rectangular projection 51 adapted to engage in the groove 50. These halves 2a and 2b are coupled and locked together by the engagement between the groove 50 and the projection 51.

The halves 2a and 2b of the shank are rotatably mounted in the halves 1a and 1b of the unit case 1 through bearings 15a and 15b, and 15', respectively. The half portion 1b is fitted on the bearings 15b of the other half portion 1a to center these portions with each other. The half portion 1a is provided in the and face opposed to the half protion 1b with the same annular groove 16 of an inverted T section as in the first embodiment. The groove 16 is formed with a hole 17' open to the inside of the case. The nuts 17 are inserted into the groove 16 through the hole 17' and bolts 18 are screwed into the nuts 17 from the side of the half portion 1b through the groove 16 to lock the halves 1a and 1b together.

Figure 12:
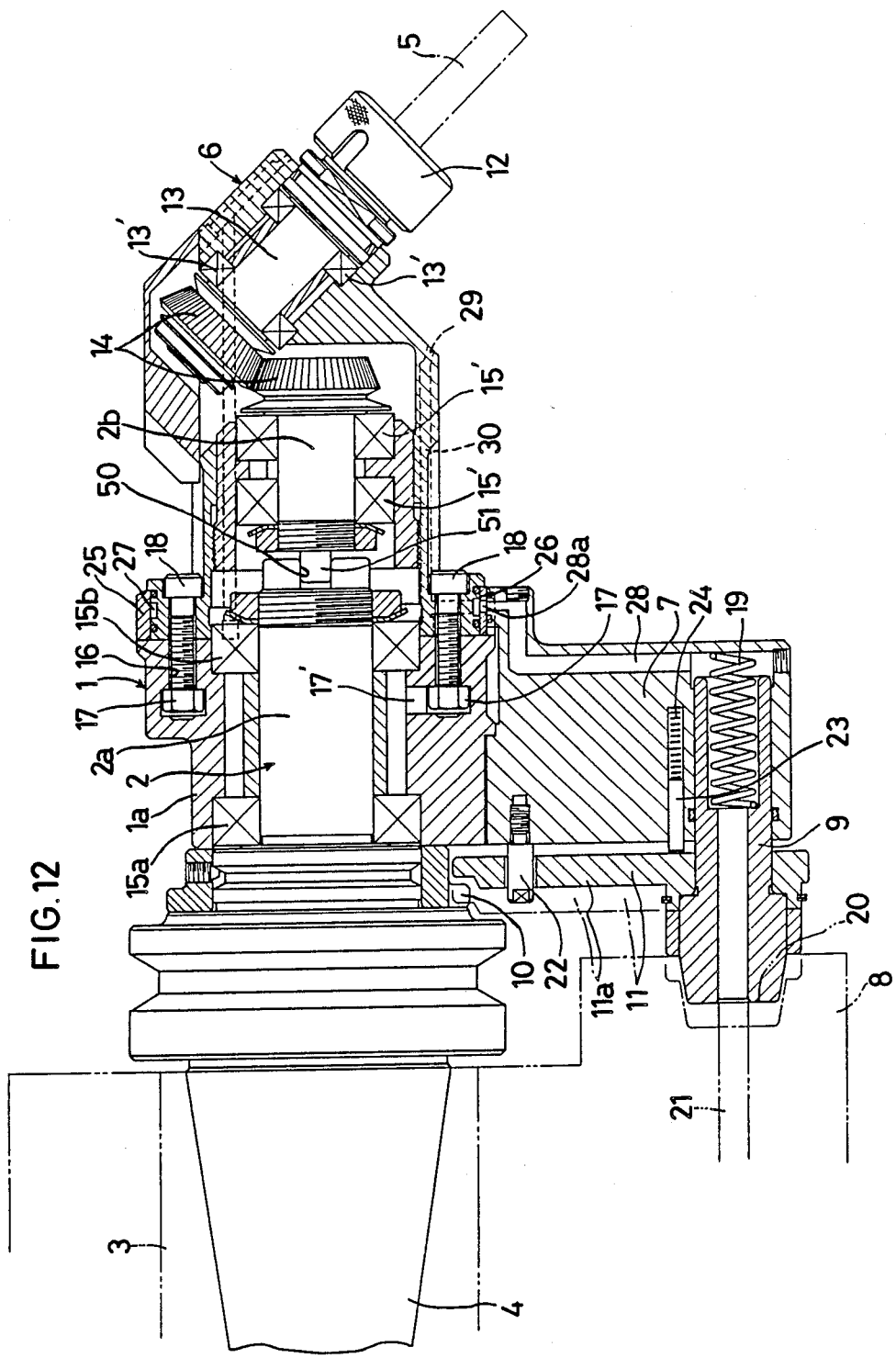
FIG. 12 is a partially cutaway front view of the fifth embodiment.

If it is desired to replace the half portion 1b with another one with a different type of chuck unit 6 such as the one as shown in FIG. 12 having its cutting tool 5 inclined at an angle of 45 degrees with respect totthe shank 2, it can be easily oone by disengaging the bolts 18 from the nuts 17. The half portions 1a and 1b of the unit case 1 and the portions 2a and 2b of the shank 2 have to have the same joint structure as described above.

Figure 18:
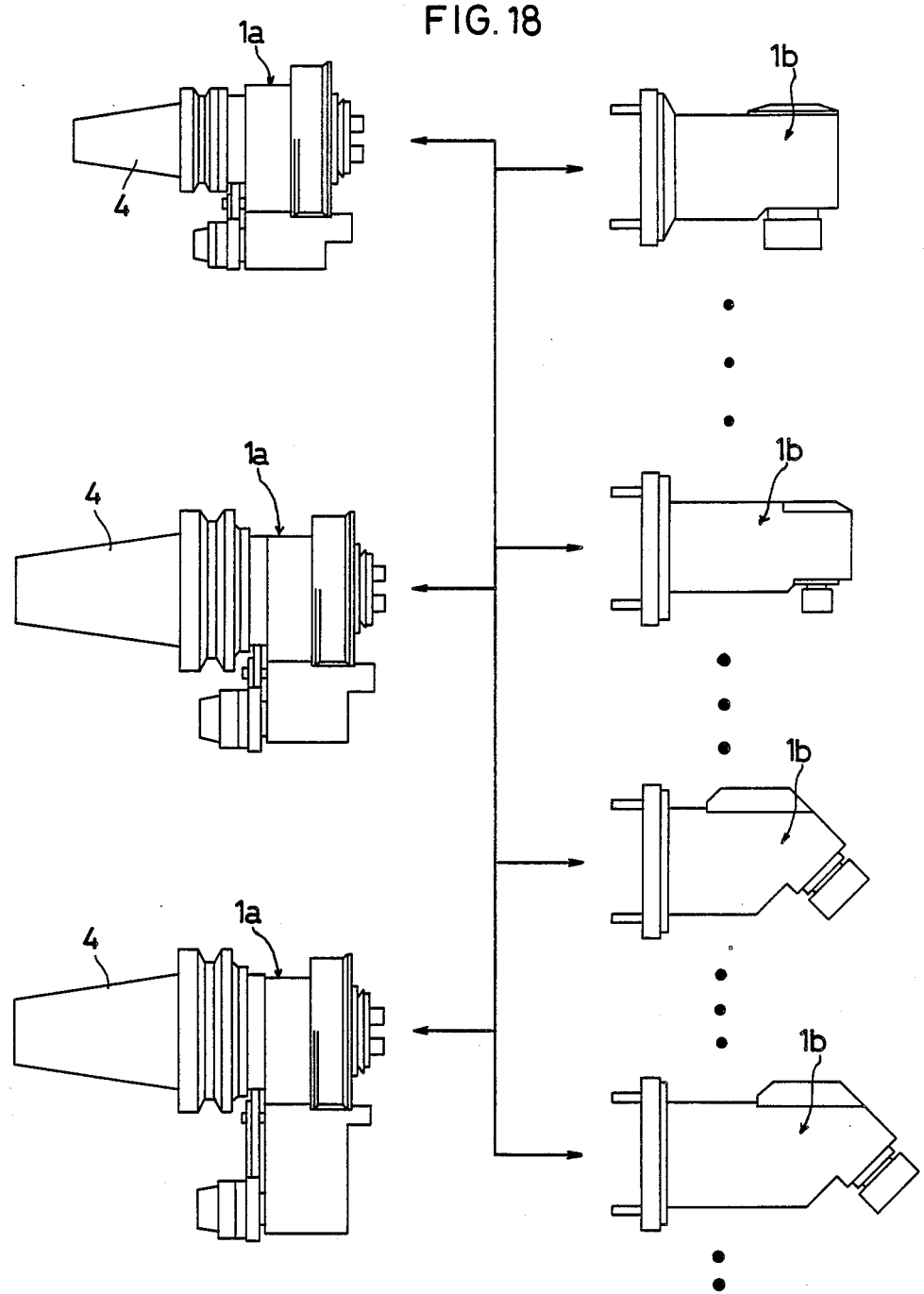
FIG. 18 is an explanatory view showing how the two portions of the unit are combined.

As shown in FIG. 18, it is convenient to prepare a required number of half portions 1a each with a joint 4 of different sizes adapted to spindles of different sizes and to prepare a required number of half portions 1b which can be coupled to any of the half portions 1a and which are different in the cutting angle and the length (the depth of cut) of the cutting tool 5.

In operation, one half portion 1a is selected according to the size of the spindle 3 and one half portion 1b is selected according to the character of cutting operation and these portions are coupled together to form a unit.

The unit is then mounted on the spindle 3 and the frame 8 as in the first embodiment. The spindle 3 is rotated to start cutting and simultaneously cutting oil will be jet through the injection nozzles 29.

As a means for coupling the halves 2a and 2b of the shank 3, other arrangements may be used such as the one shown in FIG. 15 having crossed grooves 50 and crossed projections 51, a spline coupling as shown in FIG. 16 or an Oldham's coupling as shown in FIG. 17.

<Fifth Embodiment>

In this embodiment as shown in FIG. 13, the half portion 1a is rotatably inserted in the other half portion 1b formed with the slit 31. The bolts 32 are screwed into the half portion 1b to close the gap formed by the slit 31 and reduce the inner diameter of the half portion 1b. The one half 1b is thus pressed against the other half 1a to tighten them together.

<Sixth Embodiment>

In this embodiment, as shown in FIG. 14, the half portion 1a is rotatably inserted into the half portion 1b as in the fifth embodiment. Screws 34 inserted from the side of the half portion 1b will be driven into inverted coneshaped seats 33 formed in the surface of the half portion 1a equal angular intervals (at four points for example) to couple the halves 1a and 1b together. Otherwise, one single seat 33 triangular in secton may be formed all around of the periphery of the half portion 1a.

It is to be understood that various other modifications of the present invention other than the ones in the aforementioned embodiments are possible without deviating from the scope of the invention.

What is claimed is:

1. In a unit for mounting a cutting tool comprising a unit case; a shank rotatably mounted in said unit case so as to extend through said unit case, said shank being formed at one end thereof with a joint for cnnnection with the spindle of a machine tool and at the other end thereof with a chuck unit for mounting the cutting tool at an angle with respect to said shank; said unit case being provided with a pin holder into which is removably inserted a pin for locking said unit case to the frame of the machine tool; and a stopper mounted into and out of engagement with an engaging portion integral with said shank; the improvement which said unit case is divided into a first portion having said pin holder and a second portion having said chuck unit so as to allow said second portion to be rotatable around said shank with respect to said first portion, one of said portions being formed with an annular groove to hold a plurality of nuts so as to receive bolts passed through the other of said portions to hold said two portions together.

2. A unit as claimed in claim 1, wherein said pin is hollow and communicates with a supply source of a cutting oil, said second portion having a plurality of nozzles for jetting cutting oil against the cutting tool, one of the mating surfaces of said first and second portions being formed with an annular groove through which the hollow portion of said pin communicate with said nozzles.

3. A unit as claimed in claim 1, wherein said shank, too, is divided into two portions corresponding to said two poriions of said unit case so as to be coupled together.

* * * * *